Patented June 18, 1946

2,402,189

UNITED STATES PATENT OFFICE 2,402,189

PLASTICIZED CHLORINATED RUBBERS

Frank J. Soday, Swarthmore, Pa., assignor to The United Gas Improvement Company, a corporation of Pennsylvania No Drawing. Application September 5, 1942, Serial No. 457,476

16 Claims. (Cl. 260—36)

This invention relates to new compositions of matter comprising halogenated natural rubber and/or halogenated synthetic rubber and certain high-boiling aromatic oils.

More particularly, this invention pertains to rubber compositions comprising a mixture of one or more halogenated natural rubber and/or halogenated synthetic rubbers or elastomers and a high-boiling aromatic oil separated from tar formed during the production of combustible gas by processes involving the pyrolytic decomposition of petroleum oil with or without the aid of catalysts.

An object of the invention is to provide halogenated natural rubber and/or halogenated synthetic rubber compositions suitable for use as coating and impregnating agents; for the fabrication of rolls, hose, sheets, tubes, and other objects and specialties; for the preparation of adhesives and cements; and for coating, impregnating, waterproofing, and other specialized uses; comprising one or more natural and/or synthetic halogenated rubbers and/or halogenated elastomers, and a high-boiling aromatic oil separated from tar formed during the production of combustible gas by processes involving the pyrolytic decomposition of petroleum oil with or without the aid of catalysts, with or without the incorporation of other additives selected from a list comprising drying oils, solvents, pigments, resins, fillers, extenders, and/or other plasticizing and/or softening agents. Another object of the invention is the use of such high boiling aromatic oils in conjunction with other ingredients, such as resins, resinous materials, plastic products, and other plasticizing agents as softening and/or plasticizing oils for natural and/or synthetic rubber. Other objects and advantages of the invention will be apparent to those familiar with the art upon an inspection of the specification and claims.

A considerable proportion of the softening and/or plasticizing agents employed in halogenated natural and/or synthetic rubber compounds at the present time suffer from many disadvantages, among which may be mentioned their lack of complete compatibility with such materials. This lack of complete compatibility may be shown for example, by the viscous nature of solutions of natural and/or synthetic chlorinated rubbers plasticized with certain plasticizing agents normally employed for this purpose. In the case of films formed, for example, from rubber hydrochloride, this lack of complete compatibility may be shown by the absence of a satisfactory degree of flexibility at low temperatures.

I have discovered that the aromatic hydrocarbon oil boiling above 210° C., said oil having been separated from the tar formed during the production of gas by processes involving the pyrolytic decomposition of petroleum oil, with or without the aid of catalysts, is unusually well adapted as a softening agent for natural and/or synthetic halogenated rubbers.

High-boiling aromatic oils having a preponderant portion boiling above approximately 250° C. are preferred; still more preferred are those having a preponderant portion boiling above approximately 275° C, even more preferred are those having a preponderant portion boiling above 300° C.; and especially preferred are those having a preponderant portion boiling above approximately 325° C. For certain purposes, it may be preferred to employ high boiling aromatic oils of this type which boil substantially within certain ranges, for example, between 225 and 450° C., more preferably between 300 and 450° C., and still more preferably between 325 and 450° C., though for other purposes relatively narrow cuts confined to the lower boiling ranges may be preferred.

The excellent results obtained when such aromatic oils are used as plasticizing and/or softening agents for natural and/or synthetic halogenated rubbers are due largely to the exceptional solubility characteristics of such oils, and their excellent compatibility with natural and/or synthetic halogenated rubbers and elastomers. The use of such oils in natural and/or synthetic halogenated rubber compounding results in the production of uniform compounds and finished articles or materials.

In addition, the exceptionally low viscosity characteristics of aromatic oils of the type described greatly assists in the blending and milling operations in the case of sheet and film products, and insures rapid and complete penetration.

Aromatic oils of the type described are exceptionally stable, and are strongly resistant to decomposition, thus insuring the production of uniform compounds and finished articles and compositions free from decomposition products. Such compounds, and the finished articles prepared therefrom, posses very good aging characteristics.

Aromatic oils of the type described herein are extracted and/or distilled products, consequently they contain very little, if any, free carbon or other extraneous materials. This is of considerable importance from the standpoint of the preparation of clean, uniform halogenated rubber compounds and finished articles or compositions.

It has been discovered that very considerable quantities of high-boiling aromatic oils of the type described are contained in the tar produced in the vapor phase pyrolysis of crude petroleum oil or a fraction or fractions thereof such as, for example, gas oil or residuum oil. This is particularly so in the case of petroleum oil gas tar produced when the pyrolysis is conducted at relatively high temperatures, such for example as in the manufacture of oil gas or carburetted water gas at average set temperatures above 1300° F. and also particularly so when the oil pyrolyzed is naphthenic, such as a crude oil classifiable in classes 5 to 7 inclusive, according to the method of classification described in Bureau of Mines Report of Investigations 3279 or a fraction or fractions of such an oil.

Recently, methods have been developed for the recovery of unusually large quantities of aromatic hydrocarbon material boiling in the ranges set forth, from petroleum oil gas tar, produced in the manufacture of gas, such for example, as carburetted water gas, oil gas, and the like. These methods recover high-boiling aromatic oils which are unique in character.

The usual distillation procedures employed for the purpose of petroleum tar dehydration and/or tar fractionation have been such as to polymerize the readily heat polymerizable monomers above 210° C., which are frequently present in large proportions, into heavy polymers, which became inextricably mixed with the heavy black pitch constituents and the high-boiling non-heat polymerizable aromatic oils present. As a result, the high-boiling aromatic oils were retained by the residual tar or pitch.

In copending application Serial Number 370,608, filed December 18, 1940, by Edwin L. Hall and Howard R. Batchelder, which has matured into Patent 2,387,259 granted Oct. 23, 1945, the high-boiling aromatic hydrocarbon oils containing heat polymerizable monomeric aromatic hydrocarbons boiling above 210° C. and separated from the heavy black pitch constituents of the petroleum tar are described and claimed, together with heat polymers produced from said polymerizable oils.

In copending application 386,232, filed April 1, 1941, by Waldo C. Ault which has matured into Patent 2,387,237 granted Oct. 23, 1945, there is described and claimed the production of catalytic resins from the heat polymerizable and/or catalytically polymerizable monomeric hydrocarbons boiling above 210° C. and separated in monomeric form from the heavy black pitch constituents of the petroleum tar.

The high-boiling non-heat polymerizable aromatic oils of the type described may be isolated from the unpolymerized oils obtained from each of these processes.

In the manufacture of oil gas and carburetted water gas, the tar produced is usually in the form of an emulsion due to the condensation of hydrocarbon constituents from the gas in the presence of water simultaneously condensed from the gas or otherwise present.

In copending application 342,735, filed June 27, 1940, by Edwin L. Hall and Howard R. Batchelder, which has matured into Patent 2,366,899, granted Jan. 9, 1945, there is described a method of dehydrating such petroleum tar emulsions and of fractionating the hydrocarbon constituents thereof by rapid distillation with the separation from the heavy pitch constituents of residual tar of a mixture of non-heat polymerizable aromatic hydrocarbons and heat polymerizable unsaturated monomeric aromatic hydrocarbons boiling above 210° C.

In copending application 353,034, filed August 17, 1940, by Howard R. Batchelder, which has matured into Patent 2,383,362 granted Aug. 21, 1945, there is described the dehydration of such petroleum tar emulsions and the fractionation of the hydrocarbon constituents thereof with the recovery of monomeric unsaturated heat polymerizable hydrocarbon constituents and high-boiling non-heat polymerizable aromatic oils separate from the heavy black pitch constituents of residual tar, by the solvent extraction of the emulsion with a hydrocarbon solvent such as liquefied propane or butane.

Other processes, for example fractional condensation, might be employed to recover these high boiling aromatic hydrocarbons separate from the heavy black pitch constituents of the tar. Also processes for oil pyrolysis which avoid the formation of emulsions, may be employed for the production of the high-boiling aromatic hydrocarbons. Furthermore, while it may be preferred to employ petroleum oils or cuts therefrom, which are classifiable in classes 5 to 7 inclusive according to Bureau of Mines Report of Investigations 3279 and particularly in class 7, other oils may be employed.

As a result of separation of the light oil and higher-boiling aromatic oil components of the products of such petroleum oil pyrolysis from the residual tar, without polymerization or with materially reduced polymerization, a substantially pitch-free highly aromatic hydrocarbon material may be separated having a portion boiling within the range of from 210 to 400° C., or higher, which may contain from 5% to 30%, and higher, of monomeric unsaturated aromatic hydrocarbons readily polymerizable by heat.

As previously stated, the above mentioned heat polymerizable highly aromatic monomeric material may be readily polymerized by heat to form resins, after which the high-boiling aromatic hydrocarbons may be separated from such resins by any desired method, such as by distillation, which may be assisted by steam and carried out under reduced pressures.

Polymerization may be effected by heating the total material separated from the residual tar sufficiently to polymerize the readily heat polymerizable monomers boiling within the range of from 210° to 450° C., but insufficiently to appreciably polymerize the heat polymerizable material contained in lower boiling ranges, such, for instance, as methyl styrenes and styrene. This may be accomplished, for example, by heating with stirring for 4 hours at 200° C., followed by distillation under vacuum to isolate the resin. The higher-boiling non-heat polymerizable aromatic oils then may be separated by fractional distillation.

It may be preferable, however, to first effect a separation by fractional distillation between light oil boiling below say 210° C. and oils boiling above say 210° C.

The polymerization of the heat polymerizable unsaturated monomeric material in the separated aromatic oils boiling above, say, 210° C. may be effected by heating the oil with stirring, for example, for four hours at 200° C.

The resin thus produced, together with any resin produced during the separation of the light oil from the higher-boiling oil, may then be removed by distillation under vacuum.

As hereinbefore stated, after polymerization the high-boiling non-heat polymerizable aromatic oils may be isolated from the resin by distillation in vacuum, which may be assisted by steam, or otherwise.

The high boiling monomeric material derived from tar obtained in the pyrolysis of petroleum, by rapid distillation or solvent extraction methods, or otherwise, also may be polymerized prior to the separation of the desired high-boiling non-heat polymerizable aromatic oils by the application of certain catalysts, either with or without the simultaneous, or otherwise, application of heat, for example, as described and claimed in the above copending application Serial Number 386,232, filed April 1, 1941, by Waldo C. Ault.

Catalysts such as mineral acids, for example, sulfuric acid, hydrogen chloride, acids of phosphorus, or acid-acting metallic halides or complexes of said halides, preferably organic solvent complexes, as for example, boron trifluoride, aluminum chloride, boron trifluoride-diethyl ether complex, boron trifluoride-dimethyl ether complex, boron trifluoride-phenyl ether complex, boron trifluoride-phenyl methyl ether complex, boron trifluoride-dioxan complex, boron trifluoride-toluene complex, corresponding aluminum chloride complexes, and the like, may be employed for this purpose.

The metallic halides and their complexes employed are characterized by their ability to hydrolyze in the presence of water to give an acid reaction and, hence, for convenience they may be termed acid-acting metallic halides.

While high-boiling oils of the type described may be isolated from the tar emulsion by either distillation or solvent extraction methods, as pointed out previously, I prefer to employ high-boiling oils which have been isolated by solvent extraction methods because of the presence therein of very much larger proportions of high-boiling aromatic oils of the type desired. The flash-distillation method of isolating such oils from the tar emulsion permits the polymerization of a considerable portion of the unsaturated materials to take place (though very greatly less than in conventional methods), thus increasing the quantity of resinous and/or pitch-like materials left behind in the tar. The presence of these polymers in the tar reduces the quantity of the aromatic oils recovered, and particularly those having the desired high boiling ranges.

While aromatic oils boiling above 210° C. may be produced by conventional methods of distillation of the products of vapor phase oil pyrolysis produced in the manufacture of gas, and may be employed in accordance with the present invention, such aromatic oils are by no means as preferred for this purpose, as are the high boiling aromatic oils produced by the use of separation methods which minimize polymerization of the high-boiling heat polymerizable unsaturates.

In conventional distillation methods, the tars are subjected to elevated temperatures for such lengths of time as to polymerize the far greater part, if not all, of the high-boiling heat polymerizable unsaturates. This results in the production of a very highly viscous mass, from which the removal of the higher boiling non-heat polymerizable aromatic constituents by commercially feasible methods is precluded by very great operating difficulties.

The processes which minimize or avoid polymerization in the separation of the high-boiling aromatic oil from the tar thus produce high-boiling aromatic oils which differ from those produced by conventional processes not only in their content of high-boiling heat-polymerizable unsaturates, but also in their content of the higher boiling non-heat polymerizable aromatic constituents.

High boiling aromatic oils produced by these methods are therefore unique.

In connection with the isolation of these high-boiling aromatic oils by the preferred method, namely, by the solvent extraction of the tar emulsion, it should be emphasized that the mixture of aromatic oils and unsaturated oils obtained by such methods may be fractionally distilled prior to, during, or after polymerization to isolate the aromatic oils having the desired high boiling range. Separation by distillation prior to polymerization may be preferred in certain cases for reasons more particularly set forth in said copending applications.

Thus, the extracted oils may be distilled prior to polymerization to give a fraction boiling above, say, 275-300° C., and a lower boiling fraction. These may be polymerized separately, after which the high-boiling aromatic oils of the type desired may be isolated from the resinous materials obtained.

The process may be further illustrated by the following examples.

Example 1

Petroleum oil gas tar emulsion obtained by the pyrolysis of a Bureau of Mines type 7 naphthenic oil in the presence of steam in a ceramic chamber at temperatures above 1300° F. is extracted with liquid propane. After removal of the propane, the extracted oil is flash-distilled to give a fraction boiling almost entirely above 275° C.

This fraction is polymerized by heating to a temperature of 200° C. for a period of 4 hours after which the aromatic oils are isolated by distillation until a vapor temperature of approximately 200° C., or higher, is reached at a pressure of 20 mm. of mercury absolute.

Example 2

A sample of extracted and distilled oil similar to that employed in Example 1 is polymerized by the addition of 96% sulfuric acid in small portions at temperatures below 50° C. until no further temperature rise is noted. The addition of 1% by weight of acid usually is sufficient to insure complete polymerization.

The acid sludge layer then is removed, either with or without the addition of naphtha to reduce the viscosity of the mixture, and the polymerized material washed and neutralized. The high-boiling aromatic oils then are isolated by distillation under reduced pressure.

Example 3

A sample of extracted and distilled oil similar to that employed in Example 1 is polymerized by the addition of 3% by weight of aluminum chloride-diethyl ether complex at temperatures below 50° C. After the polymerization has been completed, the catalyst is neutralized by the addition of an aqueous alkaline solution. Clay or other desired filter aid then is added and the mass filtered. The filtered material is distilled under reduced pressures to isolate the high-boiling aromatic oils.

Any combination of the foregoing methods may, of course, be employed to isolate the high-boiling aromatic oils.

The oils obtained may be employed in natural and/or synthetic halogenated rubber or halogenated elastomer compounds or blends without further treatment with excellent results. However, if desired, they may be further refined or treated by any desired method.

Thus, the high-boiling aromatic oils may be refined by washing with one or more portions of sulfuric acid, preferably of 96% concentration, until all, or substantially all, of the colored bodies are removed. The oil then may be contacted with clay or other surface-active agents, if desired, to remove any remaining impurities. Oils ranging in color from a light yellow to water white are readily obtained in this manner, the exact color of the oil obtained depending, among other things, upon the severity of the refining operation employed.

Other refining methods may, of course, be employed if desired, either alone or in conjunction with acid washing, or otherwise. Thus, the high-boiling aromatic oils may be contacted with, or percolated through, activated clay or other surface active agent.

I have discovered that aromatic oils of the type described herein should preferably have the preponderant part boil above at least 250° C., and more particularly 275° C., in order to insure the production of natural and/or synthetic halogenated rubber compositions having unusually desirable properties. Excellent results are obtained when aromatic oils of the type described, the preponderant part of which boil above 300° C., and more particularly above 325° C., are employed.

In addition, such oils are preferred which have mixed aniline points below 15° C., and more particularly below 10° C. A mixed aniline point of a given oil is defined as the critical solution temperature of a mixture of 10 cc. of anhydrous aniline, 5 cc. of the oil being tested, and 5 cc. of a naphtha having a straight aniline point of 60° C.

Such oils also are preferred which contain not less than 95%, and more particularly not less than 97%, of aromatic hydrocarbons to insure complete compatibility with natural and synthetic halogenated rubbers.

Such oils also are preferred which have densities of not less than 0.95 and, more particularly, not less than 0.98.

These values represent preferred limits for aromatic oils of the type described herein for the preparation of natural and/or synthetic halogenated rubber compositions.

As pointed out previously, high-boiling aromatic oils of the type which have been found to be particularly adapted for use as a softener and/or plasticizing agent for natural and/or synthetic halogenated rubber compounds and/or compositions may be isolated from the tar or tar emulsion obtained as a result of the pyrolytic decomposition of petroleum, or a fraction thereof, by the flash distillation or more preferably the solvent extraction of the tar or tar emulsion. The extract obtained may be separated into a high boiling and a low boiling fraction, if desired, after which the high boiling fraction, or the overall extract, may be subjected to polymerization to remove the unsaturated materials present. The oil obtained from such operations then may be refined, such as by sulfuric acid washing and/or other refining operations, after which the oil may be used as such, or it may be further distilled and/or fractionated, or it may be processed otherwise.

The oil obtained from the polymerizing operation, after separation of the polymers, also may be used as such without further refining, and such unrefined oil may be fractionated prior to use, if desired.

The oil obtained from the polymerizing operation also may be treated with clay or other surface active agent, either before or after separation from the polymers, followed by filtration and/or distillation, if desired. Successive clay treatments may be employed.

The mixture of oil and resin obtained from the polymerizing operation also may be used as such for the preparation of natural and/or synthetic halogenated rubber compounds and/or compositions, and such mixture may be refined such as by clay contacting prior to use if desired.

The oil separated from the tar or tar emulsion by flash distillation or preferably by solvent extraction methods followed by distillation to separate materials boiling below, say 210° C. or, more particularly, below 250° C., and containing higher-boiling aromatic hydrocarbons and unpolymerized or partially polymerized unsaturated aromatic hydrocarbons, may be used as such for the preparation of natural and/or synthetic halogenated rubber compounds and/or compositions, or it may be refined by any desired method such as clay contacting prior to use.

As the unpolymerized aromatic material present in such mixture is extremely heat sensitive, practically all of the unsaturated aromatic hydrocarbons present usually are converted to resinous polymers during the mixing, milling or other operations incident to the preparation of the natural and/or synthetic halogenated rubber compound or mixture.

Accordingly, the mixture of aromatic hydrocarbons and unsaturated aromatic hydrocarbons obtained from the tar or tar emulsion by flash distillation or preferably by solvent extraction methods followed by distillation may be used as such for the preparation of compositions of the type described herein, provided that the preponderating part of such material boils above at least 250° C., or such mixture may be partially or completely polymerized prior to use. The partially or completely polymerized mixture also may be distilled to remove the resinous polymer, after which the distillate may be distilled and/or refined if desired prior to use.

The invention in its broadest aspect, therefore, includes the use of an aromatic oil the preponderating portion of which boils above 250° C. as an ingredient in natural and/or synthetic rubber compositions, either alone or in admixture with unsaturated aromatic hydrocarbons boiling in the same range and/or resinous polymers derived from such unsaturated aromatic hydrocarbons.

Examples of the halogenated rubber or halogenated rubber-like materials with which aromatic oils of the type described herein may be compounded are the halides, hydrohalides, and halohydrines of the various grades and types of natural rubber and rubber-like materials, and synthetic rubbers or elastomers. Examples of synthetic rubbers or elastomers which, for convenience, are defined in the claims as polymerized diene synthetic rubber are those obtained by the polymerization of one or more diolefines, or substituents thereof, such as butadiene, isoprene, piperylene, 2-chlorobutadiene, and the like, either alone, or in admixture, or in combination with one or more unsaturated and/or reactive compounds or materials such as olefines, unsaturated nitriles, acids, esters, ethers, ketones, aldehydes, and/or substituents thereof, such as, for example, styrene, acrylic nitrile, isobutylene, acrylic esters, and the like. Important examples of halogenated synthetic rubbers or elastomers are those obtained by the halogenation of the rubbers obtained by the copolymerization of one or more diolefines with (1) acrylic nitrile, (2) styrene or substituents thereof, and/or (3) isobutylene or similar olefines. The materials from which these halides are produced are known in the art under different trade names, such as, for example, Buna, Buna S, Buna N. Perbunan, Neoprene, Ameripol, Hycar, Butyl rubber, and the like.

Important examples of halogenated rubbers are chlorinated natural rubber and natural rubber hydrochloride.

Chlorinated natural rubber may be prepared by the action of chlorine on rubber, or on a suspension or solution of rubber in a suitable solvent. Thus, rubber may be milled in an atmosphere of chlorine, or liquid or gaseous chlorine may be added to powdered rubber or to strips or sheets of rubber. In the latter case, the sheets or strips of rubber may be suspended in a suitable solvent, such as carbon tetrachloride, during the addition of the chlorine.

Probably the most satisfactory method for the production of chlorinated rubber comprises the addition of chlorine to a solution of the rubber in a suitable solvent, such as carbon tetrachloride, or other alkyl, alkylene, or aryl halides.

While any desired amount of chlorine may be added to the rubber, the product which has been adopted generally by the industry contains from 60 to 68% chlorine by weight.

Mastication of the rubber before, during, or after chlorination frequently is resorted to in order to lower the molecular weight, and hence the viscosity, of the resulting product. Oxidation processes also may be employed for the same purpose, either alone or in combination with mastication processes.

Chlorinated rubber as prepared is somewhat unstable, consequently it usually is stabilized prior to use. A number of different methods have been developed for this purpose, including stirring or refluxing in the presence of an aqueous alkaline solution. The addition of basic compounds, such as diphenylamine and barium oxide, also has been resorted to in order to improve the stability of this product.

The chief outlet for chlorinated rubber has been in the protective coating industry, where it is used in the form of varnishes, both of the oil and spirit type, paints, lacquers, enamels and other coating compositions. In addition, it is employed in the production of moldings, and is used in expanded form for insulation purposes.

The chief disadvantages of chlorinated rubber, particularly from the standpoint of its use in coating applications, are its highly viscous nature and its pronounced brittle properties. These have largely restricted its field of utilization.

Natural rubber hydrochloride is commonly prepared by the addition of hydrogen chloride to a solution of rubber in a suitable solvent, such as a chlorinated hydrocarbon. Alternative processes include the addition of hydrogen chloride to rubber in massive form, such as in the form of powder, sheets, and strips, and to rubber suspended in a suitable liquid, such as ethyl acetate.

As in the case of chlorinated rubber, rubber hydrochloride preferably is stabilized prior to use to prevent decomposition.

Rubber hydrochloride usually contains considerably less chlorine than chlorinated rubber. Thus, rubber hydrochloride normally contains 18%, or less, of chlorine. Rubber hydrochloride may be used in a large number of applications, one of the most important of which is the preparation of elastic films or sheets, and in the preparation of waterproofing compositions.

By the use of analogous processes, chlorinated and hydrochlorinated rubberlike materials may be prepared from synthetic rubbers or elastomers.

As pointed out previously, I have discovered that high-boiling aromatic oils of the type more particularly described herein are exceptionally well adapted for use as softening and plasticizing agents for natural and synthetic halogenated rubbers.

The quantity of aromatic oils of the type described herein which may be incorporated in natural or synthetic halogenated rubbers, or halogenated elastomers, may be varied over very wide limits, depending upon the properties desired. Thus, for example, quantities varying from a few per cent, or less, to an amount equal to, or greater than, the quantity of halogenated rubber, or halogenated rubber mixture, employed in the composition, may be used.

In addition to aromatic oils of the type described herein, other ingredients which may be incorporated in natural halogenated rubber and/or synthetic halogenated rubber compositions include other softening and/or plasticizing agents such as, for example, non-drying oils, such as castor oil and cottonseed oil; halogenated aromatic compounds, such as the chlorinated diphenyls; hydrogenated alkyl or aralkyl esters of abietic acid; pine tar; phthalic acid esters, such as dibutyl phthalate; phosphoric acid esters, such as triphenyl phosphate and tricresyl phosphate; and fatty acid esters, such as butyl stearate.

When one or more of such plasticizing agents are used in conjunction with high-boiling aromatic oils of the type described as plasticizing agents for halogenated rubber, I prefer to have the said high-boiling aromatic oil as the preponderating constituent of such plasticizing mixture.

An important class of additives, particularly in the case of chlorinated rubber, is drying oils, which may be either raw or bodied. Examples of desirable drying oils are linseed oil, tung oil, oiticica oil, perilla oil, soya bean oil, fish oil, and synthetic drying oils, such as the dehydrated castor oils.

Thus, chlorinated rubber may be dissolved in a raw or bodied drying oil, preferably the latter, to form a coating composition possessing excellent protective properties. Solvents may be incorporated in such compositions, examples of suitable solvents including hydrocarbons, such as solvent naphtha and aromatic hydrocarbons; chlorinated hydrocarbons; and glycerol ethers.

Pigments also may be included in halogenated rubber or halogenated rubber compositions, examples of which are zinc oxide, lithopone, Titanox, carbon black, chrome yellow, chrome green, iron oxide, and red lead.

Waxes also may be added to halogenated rubber and halogenated rubber compositions, particularly when such materials are employed for coating paper or textiles, such as for waterproofing purposes. Examples of suitable waxes are paraffin, spermaceti, carnauba wax, ozocerite, bayberry wax, Japan wax, sugar cane wax, montan wax, and the like.

Other materials which may be added to halogenated rubber or halogenated rubber compositions include driers, inhibitors, anti-oxidants, acid-neutralizing agents, and the like.

Resins and resinous materials also may be added to halogenated rubber and halogenated rubber compositions. Examples of such resins are rosin, ester gum, dammar, copal, amberols, cumar resins, and the like.

A preferred embodiment of this invention is the use of an aromatic oil of the type described in combination with one or more resinous materials as a softener for natural and/or synthetic halogenated rubber compositions. A preferred resin for incorporating with the aromatic oil is the resin obtained by the polymerization, by thermal and/or catalytic methods, of certain high boiling monomeric material separated in monomeric form from tar formed during the production of combustible gas by processes involving the pyrolytic decomposition of petroleum oil with or without the aid of catalysts. As pointed out previously, such resins may be formed in situ in aromatic oils of the type described herein.

Another desired resin which may be incorporated in the high-boiling oil as a softener for natural and/or synthetic halogenated rubber is the resin derived by the polymerization of petroleum and/or coal tar fractions containing indene and/or coumarone.

Other desirable ingredients which may be blended with an aromatic oil of the type described either alone or in combination with one or more resinous materials as a softener for natural and/or synthetic halogenated rubber include the dimers of petroleum or coal tar fractions containing indene and/or coumarone.

It may be said, therefore, that chlorinated rubber commonly is employed in the form of a solution in a suitable solvent and/or drying oil, which may contain other ingredients such as basic compounds, driers, inhibitors, antioxidants, pigments, coloring agents, and resinous materials. The addition of high-boiling aromatic oils of the type described herein greatly improves the viscosity characteristics of such systems and the flexibility of the coating obtained therefrom.

An important outlet for rubber hydrochloride is in the formation of flexible foil, sheets, and other forms. The rubber hydrochloride to be used for this purpose, or for other purposes, frequently contains additives such as pigments, coloring agents, basic compounds, acid accepting compounds, antioxidants, inhibitors, and resinous materials. The addition of aromatic oils of the type described herein to rubber hydrochloride, or rubber chloride compositions, greatly improves the flexibility and elastic properties of such materials.

In addition, chlorinated rubber and/or rubber hydrochloride frequently are employed in coating, impregnating, and/or waterproofing fabrics, paper, and other fibrous materials, either alone or in combination with other materials, particularly waxes, as well as basic materials, acid-accepting materials, antioxidants, inhibitors, pigments, coloring agents, resinous materials, and the like. The addition of high-boiling aromatic oils of the type described herein greatly reduces the viscosity of such compositions, which is of value in assuring ease of application and satisfactory penetration, and greatly improves the elasticity and flexibility of the resulting coated and/or impregnated material.

Another important advantage accruing from the use of high-boiling aromatic oils of the type described herein in chlorinated rubber and/or rubber hydrochloride compositions is the unusual stability of such systems. This is due to the fact that the said oils act as effective acid-accepting agents, thus preventing any accumulation of acidic bodies which would cause rapid deterioration of such halogenated rubbers. This benefit is entirely unexpected, and is of the utmost commercial importance.

The invention may be further illustrated by means of the following examples.

*Example 4*

A varnish is prepared by dissolving 25 parts of chlorinated rubber in 50 parts of solvent naphtha, 25 parts of bodied tung oil containing limed rosin, and 25 parts of an aromatic oil of the type described herein and having an initial boiling point above 250° C. Upon applying this composition to a wooden, metallic, or other surface, a tough, glossy film is obtained.

*Example 5*

A mixture of 50 parts of chlorinated rubber, 50 parts of ceresin, and 50 parts of an aromatic oil of the type described herein and having an initial boiling point above 275° C., is applied to paper or fabric by means of heat. A waterproof finish is thus obtained.

*Example 6*

A mixture of 75 parts of rubber hydrochloride, 25 parts of wax, and 25 parts of an aromatic oil of the type described herein is applied to fabric on a calendar. A flexible, adherent waterproof coating is imparted to the fabric.

*Example 7*

Rubber hydrochloride containing a stabilizing agent, 5% of pine tar, and 5% of an aromatic oil of the type described herein and having an initial boiling point above 300° C. is extruded to form a flexible sheet.

High-boiling aromatic oils of the type described herein are particularly desirable softening and plasticizing agents for halogenated rubbers because of (1) their excellent solubility characteristics, reducing the time required to make halogenated rubber compositions; (2) their excellent compatibility with halogenated rubbers; (3) their viscosity reducing characteristics, which is of the utmost importance in the preparation of halogenated rubber coating and impregnating compositions; (4) their excellent dispersing qualities, materially reducing the time required to make pigmented, and other, compounds; (5) their stabilizing action, very greatly reducing the tendency for halogenated rubbers to decompose; (6) their freedom from impurities and foreign bodies; (7) their unexcelled stability on exposure to a variety of decomposing conditions, such as sunlight and heat; and (8) their excellent dielectric properties.

In the specification and in the claims, the following terms have the indicated meanings.

The term "fibrous material" includes both organic and mineral fibers and formed articles formed therefrom, such as fabrics, textiles, paper, felt and the like.

In the specification and in the claims, the terms "aromatic oil boiling above 250° C." and "aromatic oil boiling above 275° C.," unless otherwise modified, is intended to include the unrefined or refined oil, the preponderating portion of which boils above the indicated temperatures, separated from tar formed during the production of combustible gas by processes involving the pyrolytic decomposition of petroleum oil with or without the aid of catalysts, as well as mixtures of such aromatic oil with the unsaturated aromatic hydrocarbons derived from the same source and/or the resinous polymers derived therefrom.

While various procedures and formulas have been particularly described these are of course subject to considerable variation. Therefore, it will be understood that the foregoing specific examples are given by way of illustration, and that changes, omissions, additions, substitutions and/or modifications might be made within the scope of the claims without departing from the spirit of the invention, which is intended to be limited only as required by the prior art.

I claim:

1. As a new composition of matter, one of a group consisting of chlorinated natural rubber and chlorinated polymerized diene synthetic rubber admixed with a substantially pitch-free aromatic hydrocarbon oil boiling above 210° C. and separated from other constituents including the heavy black pitch constituents of tar obtained in the vapor phase pyrolysis at average set temperatures above 1300° F. of petroleum oil in the production of combustible gas, said aromatic hydrocarbon oil having an aromatic hydrocarbon content of at least 95%, and a density of at least 0.95.

2. As a new composition of matter, chlorinated natural rubber, and a substantially pitch-free aromatic hydrocarbon oil boiling above 250° C. and separated from other constituents including the heavy black pitch constituents of tar obtained in the vapor phase pyrolysis at average set temperatures above 1300° F. of petroleum oil in the production of combustible gas, said aromatic hydrocarbon oil having an aromatic hydrocarbon content of at least 95%, and a density of at least 0.95.

3. As a new composition of matter, chlorinated polymerized diene synthetic rubber, and a substantially pitch-free aromatic hydrocarbon oil boiling above 250° C. and separated from other constituents including the heavy black pitch constituents of tar obtained in the vapor phase pyrolysis at average set temperatures above 1300° F. of petroleum oil in the production of combustible gas, said aromatic hydrocarbon oil having an aromatic hydrocarbon content of at least 95%, and a density of at least 0.95.

4. As a new composition of matter, chlorinated natural rubber, and a substantially pitch-free aromatic hydrocarbon oil boiling above 250° C. and separated from other constituents including the heavy black pitch constituents of tar produced in the vapor phase pyrolysis in the production of combustible gas at average temperatures above 1300° F. of petroleum oil classified as #7 by the Bureau of Mines method of classification set forth in Bureau of Mines Report of Investigations 3279, said aromatic hydrocarbon oil having an aromatic hydrocarbon content of at least 97%, and a density of at least 0.98.

5. As a new composition of matter, chlorinated polymerized diene synthetic rubber, and a substantially pitch-free aromatic hydrocarbon oil boiling above 250° C. and separated from other constituents of tar produced in the vapor phase pyrolysis in the production of combustible gas at average temperatures above 1300° F. of petroleum oil classified as #7 by the Bureau of Mines method of classification set forth in Bureau of Mines Report of Investigations 3279, said aromatic hydrocarbon oil having an aromatic hydrocarbon content of at least 97%, and a density of at least 0.98.

6. A process comprising admixing one of a group consisting of chlorinated natural rubber and chlorinated polymerized diene synthetic rubber, with a substantially pitch-free aromatic hydrocarbon oil boiling above 250° C. and separated from other constituents including the heavy black pitch constituents of tar produced in the vapor phase pyrolysis in the production of combustible gas at average temperatures above 1300° F. of petroleum oil, said aromatic hydrocarbon oil having an aromatic hydrocarbon content of at least 95%, and a density of at least 0.95.

7. A process comprising, admixing chlorinated natural rubber, and a substantially pitch-free aromatic hydrocarbon oil boiling above 250° C., and separated from other constituents including the heavy black pitch constituents of tar produced in the vapor phase pyrolysis in the production of combustible gas at average temperatures above 1300° F. of petroleum oil, said aromatic hydrocarbon oil having an aromatic hydrocarbon content of at least 95%, and a density of at least 0.95.

8. A process comprising, admixing chlorinated natural rubber, and a substantially pitch-free aromatic hydrocarbon oil boiling above 250° C. and separated from other constituents including the heavy black pitch constituents of tar produced in the vapor phase pyrolysis in the production of combustible gas at average temperatures above 1300° F. of petroleum oil classified as #7 by the Bureau of Mines method of classification set forth in Bureau of Mines Report of Investigations 3279, said aromatic hydrocarbon oil having an aromatic hydrocarbon content of at least 97%, and a density of at least 0.98.

9. As a new composition of matter, one of a group consisting of chlorinated natural rubber and chlorinated polymerized diene synthetic rubber admixed with a hydrocarbon resin produced by the polymerization of unsaturated monomeric aromatic hydrocarbon material the preponderant portion of which boils in the range of 210° C. to 450° C., and a substantially pitch-free aromatic hydrocarbon oil boiling between 210° C. and 450° C., said aromatic hydrocarbon oil having an aromatic hydrocarbon content of at least 95%, and a density of at least 0.95, said unsaturated monomeric aromatic hydrocarbon material and said aromatic hydrocarbon oil having been separated from other constituents including the heavy black pitch constituents of tar produced in the vapor phase pyrolysis at average set temperatures above 1300° F. of petroleum oil in the production of combustible gas.

10. A composition of matter comprising, one of a group consisting of chlorinated natural rubber and chlorinated polymerized diene synthetic rubber admixed with a substantially pitch-free aromatic hydrocarbon oil boiling between 300° C. and 450° C. and separated from other constituents including the heavy black pitch constituents of tar produced in the vapor phase pyrolysis at average set temperatures above 1300° F. of petroleum oil in the production of combustible gas, said aromatic hydrocarbon oil having an aromatic hydrocarbon content of at least 97%, and a density of at least 0.98.

11. A composition of matter comprising, one of a group consisting of chlorinated natural rubber and chlorinated polymerized diene synthetic rubber admixed with a substantially pitch-free aromatic hydrocarbon oil boiling between 325° C. and 450° C. and separated from other constituents including the heavy black pitch constituents of tar produced in the vapor phase pyrolysis at average set temperatures above 1300° F. of petroleum oil in the production of combustible gas, said aromatic hydrocarbon oil having an aromatic hydrocarbon content of at least 97%, and a density of at least 0.98.

12. A coating composition comprising, one of a group consisting of chlorinated natural rubber and chlorinated polymerized diene synthetic rubber admixed with a drying oil, and a substantially pitch-free aromatic hydrocarbon oil boiling above 250° C. and separated from other constituents including the heavy black pitch constituents of tar produced in the vapor phase pyrolysis at average set temperatures above 1300° F. of petroleum oil in the production of combustible gas, said aromatic hydrocarbon oil having an aromatic hydrocarbon content of at least 95%, and a density of at least 0.95.

13. As a new composition of matter, one of a group consisting of chlorinated natural rubber and chlorinated polymerized diene synthetic rubber admixed with wax, and a substantially pitch-free aromatic hydrocarbon oil boiling above 250° C. and separated from other constituents including the heavy black pitch constituents of tar produced in the vapor phase pyrolysis at average set temperatures above 1300° F. of petroleum oil in the production of combustible gas, said aromatic hydrocarbon oil having an aromatic hydrocarbon content of at least 95%, and a density of at least 0.95.

14. A fibrous material coated with a composition comprising one of a group consisting of chlorinated natural rubber and chlorinated polymerized diene synthetic rubber admixed with a substantially pitch-free aromatic hydrocarbon oil boiling above 250° C. and separated from other constituents including the heavy black pitch constituents of tar produced in the vapor phase pyrolysis at average set temperatures above 1300° F. of petroleum oil in the production of combustible gas, said aromatic hydrocarbon oil having an aromatic hydrocarbon content of at least 95%, and a density of at least 0.95.

15. As a new composition of matter, chlorinated polymerized diene synthetic rubber admixed with a substantially pitch-free aromatic hydrocarbon oil boiling above 250° C. and separated from other constituents including the heavy black pitch constituents of tar produced in the vapor phase pyrolysis at average set temperatures above 1300° F. of petroleum oil in the production of combustible gas, said aromatic hydrocarbon oil having an aromatic hydrocarbon content of at least 95%, and a density of at least 0.95, and said synthetic rubber being derived by the polymerization of butadiene with styrene.

16. As a new composition of matter, chlorinated polymerized diene synthetic rubber admixed with a substantially pitch-free aromatic hydrocarbon oil boiling above 250° C. and separated from other constituents including the heavy black pitch constituents of tar produced in the vapor phase pyrolysis at average set temperatures above 1300° F. of petroleum oil in the production of combustible gas, said aromatic hydrocarbon oil having an aromatic hydrocarbon content of at least 95%, and a density of at least 0.95, and said synthetic rubber being derived by the polymerization of butadiene with isobutylene.

FRANK J. SODAY.